United States Patent [19]
Betin et al.

[11] Patent Number: 5,726,795
[45] Date of Patent: Mar. 10, 1998

[54] COMPACT PHASE-CONJUGATE MIRROR UTILIZING FOUR-WAVE MIXING IN A LOOP CONFIGURATION

[75] Inventors: Alexander A. Betin, Calabasas; Metin S. Mangir, Santa Monica, both of Calif.; David A. Rockwell, Carmel, Ind.

[73] Assignee: Hughes Electronics, Los Angeles, Calif.

[21] Appl. No.: 741,274

[22] Filed: Oct. 30, 1996

[51] Int. Cl.$^6$ ............................................. G02B 26/08
[52] U.S. Cl. ............................... 359/300; 359/302
[58] Field of Search ............................ 359/300, 298, 359/301, 302, 303

[56] References Cited

U.S. PATENT DOCUMENTS

| | | | |
|---|---|---|---|
| 5,113,282 | 5/1992 | O'Meara et al. | 359/300 |
| 5,303,032 | 4/1994 | Uesu et al. | 359/300 |
| 5,396,368 | 3/1995 | Khoshnevisan et al. | 359/300 |
| 5,535,024 | 7/1996 | Khoury et al. | 359/300 |

OTHER PUBLICATIONS

John H. Marburger, "Improvements upon the Simple Theory of Degenerate Four–Wave Mixing", *Optical Phase Conjugation*, Ed. Robert A. Fisher, Academic Press, Florida, 1983, pp. 99–125.

Bel'dyugin et al., "Wavefront reversal of optical radiation using feedback in four–wave interaction", *Soviet Journal of Quantum Electronics*, vol. 14, No. 5, 1984, pp. 602–605.

A.A. Betin et al., "Structure of lasing modes generated as a result of a four–wave interaction with feedback", *Sovient Journal of Quantum Electronics*, vol. 18, No. 5, 1988, pp. 657–663.

N.G. Basov et al., "Inversion of wavefront in SMBS of a depolarized pump", *JETP Letters*, vol. 28, 1978, pp. 197–201.

J.M. Eggleston et al., "Slab–geometry Nd:glass laser performance studies", *Optics Letters*, vol. 7, No. 9, Sep. 1982, pp. 405–407.

M.E. Brodov et al., "Eight–pass neodymium glass slab amplifier with a waveguide and with phase conjugation", *Soviet Journal of Quantum Electronics*, vol. 17, No.10 Oct. 1987, pp. 1265–1266.

A.A. Betin et al., "Selection of a phase–conjugate wave in an oscillator based on a four–wave interaction with feedback in an extended nonlinear medium", *Quantum Electronics*, vol. 24, No. 3, 1994, pp. 219–222.

A.A. Betin et al., "Reflection of speckle–inhomogeneous $CO_2$laser radiation under four–wave interaction conditions with feedback", *Quantum Electronics*, vol. 24, No. 1, 1994, pp. 59–62.

*Primary Examiner*—Frank G. Font
*Assistant Examiner*—Robert Kim
*Attorney, Agent, or Firm*—V. D. Duraiswamy; W. K. Denson-Low

[57] ABSTRACT

A compact loop four-wave mixing phase conjugator that can be used in practical optical applications comprises a reflective nonlinear cell, relay optics, an optical gain medium, and an optical diode that together form a unidirectional ring laser resonator. In operation, a signal beam $\epsilon_1$ is directed to the nonlinear cell, where it passes through a nonlinear medium contained within the cell and is reflected out of the cell as loop beam $\epsilon_2$. The relay optics direct loop beam $\epsilon_2$ through the optical diode, optical gain medium, and back to the nonlinear cell, where it intersects and optically interferes with the signal beam $\epsilon_1$ to form a refractive index grating in the nonlinear medium. The optical diode and gain medium are positioned in the loop so that an oscillation beam $\epsilon_3$ builds up from optical noise in the resonator and oscillates in a direction counter to the propagation direction of loop beam $\epsilon_2$. A portion of oscillation beam $\epsilon_3$ is transmitted by the refractive index grating, reflects off the reflective portion of the nonlinear cell and emerges from the cell as phase conjugate output beam $\epsilon_4$.

16 Claims, 3 Drawing Sheets

COMPACT PHASE-CONJUGATE MIRROR UTILIZING FOUR-WAVE MIXING IN A LOOP CONFIGURATION

GOVERNMENT RIGHTS

This invention was made with Government support under Agreement No. MDA972-94-3-0020 awarded by ARPA. The Government has certain rights in this invention. The Government has certain rights in this invention.

BACKGROUND OF THE INVENTION

1. Field of the Invention

This invention relates to phase-conjugate mirrors, and more particularly to a compact loop-configuration phase conjugator that utilizes four-wave mixing.

2. Description of the Related Art

Optical phase conjugation is a well known technique that utilizes nonlinear optical effects to precisely reverse both the direction of propagation and the overall phase factor for each plane wave in an arbitrary beam of light.

Four-wave mixing is a common and well known nonlinear process for achieving phase conjugation. For an introduction to phase conjugation via four-wave mixing, see John H. Marburger, "Improvements upon the Simple Theory of Degenerate Four-Wave Mixing", in *Optical Phase Conjugation*, Ed. Robert A. Fisher, Academic Press, Florida (1983), pages 99–125.

Phase conjugators that employ four-wave mixing typically require multiple pumping beams to drive the medium into a nonlinear regime. To satisfy this requirement, bulky and complicated optical architectures are typically used, which preclude the use of four-wave mixing conjugators in practical laser devices.

Loop four-wave mixing phase conjugators, described in I. M. Bel'dyugin, M. G. Galushkin, and E. M. Zemskov, "Wavefront reversal of optical radiation using feedback in four-wave interaction", *Soviet Journal of Quantum Electronics*, Vol. 14, No. 5, pages 602–605 (1984) and A. A. Betin and N. Yu. Rusov, "Structure of lasing modes generated as a result of a four-wave interaction with feedback", *Soviet Journal of Quantum Electronics*, Vol. 18, No. 5, pages 657–663 (1988), utilize a simpler architecture by generating the multiple pumping beams from the signal beam to be phase conjugated. However, these conjugators have only been demonstrated in the laboratory, and a compact packaging scheme for use in practical applications has not been developed.

SUMMARY OF THE INVENTION

In view of the above problems, the present invention provides a compact loop four-wave mixing phase conjugator that can be used in practical optical applications.

This is accomplished by utilizing a reflective nonlinear cell and relay optics. A signal beam is directed to the nonlinear cell, where it passes through a nonlinear medium contained within the cell and is reflected back through the nonlinear medium and out of the cell as a loop beam. The relay optics direct the loop beam back to the nonlinear cell, where it intersects and optically interferes with the signal beam to form a refractive index grating in the nonlinear medium. The relay optics and reflection from the refractive index grating form an optical loop.

An optical gain medium is positioned in the loop to provide optical gain for beams propagating in the loop. In addition, an optical diode is also positioned in the loop to produce a non-reciprocal loss in the loop that is greater for beams propagating along the direction of the loop beam.

The optical gain medium converts the optical loop into a ring laser resonator. The optical diode and gain medium are positioned in the loop so that an oscillation beam builds up from optical noise in the resonator and oscillates in a direction counter to the propagation direction of the loop beam. A portion of the oscillation beam is transmitted by the refractive index grating, reflects off the reflective portion of the nonlinear cell and emerges from the cell as a phase conjugate output beam. A small portion of the oscillation beam is diffracted by the index grating back into the loop to maintain lasing in the loop.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
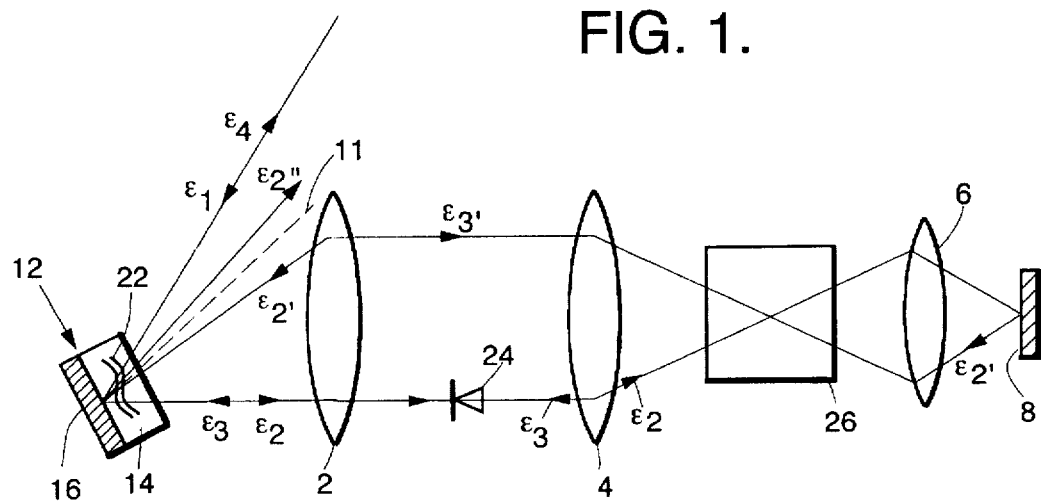
FIG. 1 is schematic diagram illustrating the basic principles of the invention.

FIG. 1 illustrates the basic principles of the invention, in which a mirrored nonlinear cell is combined with simple optics that relay the image of the interaction region in the cell's nonlinear medium to an amplifier and back, in a highly compact package. A signal beam $\epsilon_1$ is directed to a nonlinear cell 12 that contains a nonlinear medium 14 and a reflective back surface 16. Signal beam $\epsilon_1$ enters the cell 12, reflects off the back surface 16 and emerges from the cell 12 as loop beam $\epsilon_2$. It then passes through a pair of imaging lenses 2 and 4, with an optical diode 24 in the beam path followed by an amplifier 26 formed from an optical gain medium. The loop beam $\epsilon_2$ is then focused by a lens 6 onto a mirror 8, which redirects it as return beam $\epsilon'_2$ back through lens 6, amplifier 26 and lenses 2,4 (but not optical diode 24) to the nonlinear cell 12 so that loop beam $\epsilon'_2$ optically interferes with signal beam $\epsilon_1$ in the nonlinear medium 14 and forms a refractive index grating 22.

Optical diode 24 and optical amplifier 26 are positioned in an optical loop formed by lenses 2, 4 and 6, mirror 8 and refractive index grating 22. The optical diode 24 produces a non-reciprocal optical loss in the loop that is greater for beams propagating along the propagation direction of loop beam $\epsilon_2$. Therefore, loop beam $\epsilon_2$ is highly attenuated as it passes through diode 24. The optical amplifier 26 provides optical gain to any optical beam that passes through it, and converts the optical loop into a ring laser resonator.

In operation, an oscillation beam $\epsilon_3$ builds up from optical noise in the resonator/loop and oscillates in a direction counter to the propagation direction of loop beam $\epsilon_2$ due to the non-reciprocal loss introduced by optical diode 24. A portion of beam $\epsilon_3$ is diffracted by grating 22 and remains in the loop as beam $\epsilon_3'$ to maintain lasing action in the loop, while another portion is transmitted through the grating 22, reflects off the reflective back surface 16 and exits the cell 12 as phase conjugate output beam $\epsilon_4$. Similarly, a portion of beam $\epsilon_2'$ exits the cell 12 as beam $\epsilon''_2$. Part of the $\epsilon_3$ beam reflected from surface 16 is also diffracted by the grating before it exits the cell 12, and remains within the loop. Beams $\epsilon_4$ and $\epsilon''_2$ exit the cell at equal angles to the cell axis 11 as their originating beams $\epsilon_3$ and $\epsilon'_2$ but on opposite sides of the axis from the originating beams.

Figure 2:
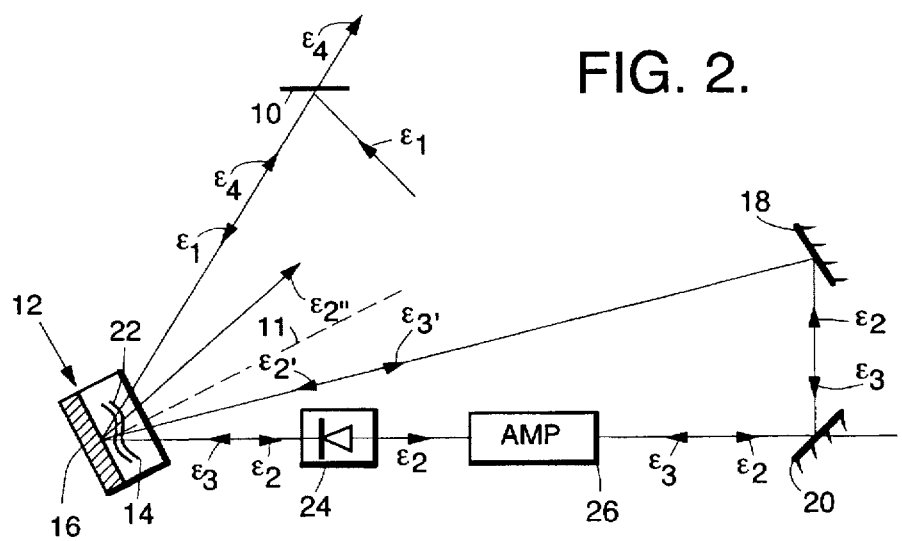
FIG. 2 is a schematic diagram illustrating one implementation of the invention.

FIG. 2 illustrates an implementation in which the optical diode 24 and amplifier 26 are positioned directly in-line with the beam $\epsilon_2$ emerging from the cell 12, and a pair of mirrors 18,20 direct the output of amplifier 26 back to the cell in a generally triangular path. In this embodiment a beam director 10, preferably a beam splitter, directs input signal beam $\epsilon_1$ into the cell 12 and transmits output beam $\epsilon_4$ along a path separated from the input beam.

Figure 3:
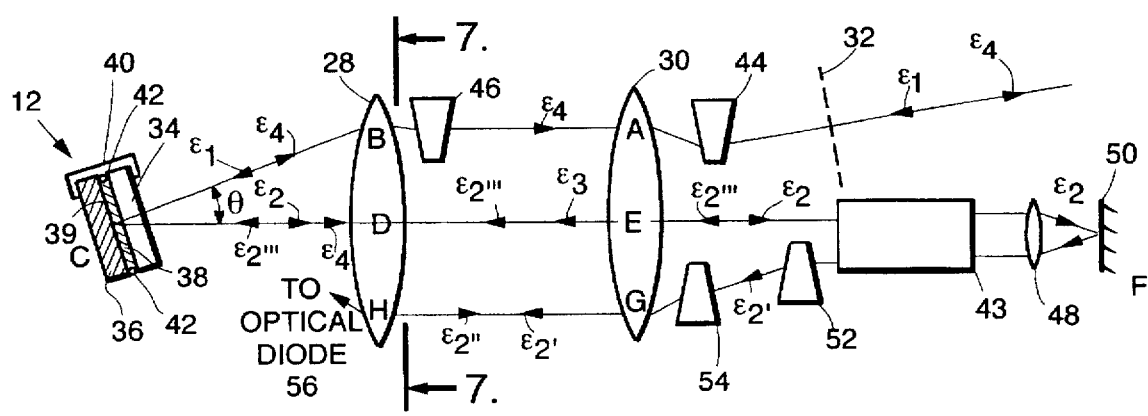
FIG. 3 is a schematic diagram illustrating a preferred embodiment of the invention.

FIGS. 3–6 illustrate a preferred embodiment of the invention. In FIG. 3, the signal beam $\epsilon_1$ is incident from the right. It passes through an imager, preferably two imaging lenses 28 and 30 with focal lengths $f_1$ and $f_2$, respectively, and with a magnification M=($f_2/f_1$) greater than one. Lenses 28 and 30 image an input plane 32 into nonlinear cell 12.

The nonlinear cell 12 is preferably comprised of a front window 34 and back window 36 with a nonlinear medium 38 sandwiched between them. The windows are preferably held together with a clamp 40, and spacers 42 are preferably used to provide control over the thickness of the nonlinear medium 38. The back window 36 has a reflective coating 39 on its inside surface, preferably a deposited metal coating with a dielectric coating over the metal.

Any type of nonlinear medium 38 may be used in the cell 12. However, in the preferred embodiment an absorptive nonlinear medium 38 with a thermal-based nonlinearity is used. For a 1 micron wavelength signal beam $\epsilon_1$, the nonlinear material 38 is preferably copper nitrate in an acetone base, with the amount of copper nitrate and the thickness of the nonlinear medium 28 adjusted so that the signal beam $\epsilon_1$ experiences approximately 5–15 percent absorption per pass through the medium 38. The window 34 should be optically transparent at the signal beam $\epsilon_1$ wavelength.

The signal beam $\epsilon_1$ passes through the nonlinear medium 38, reflects off the reflective coating 39 and exits the cell 12 as loop beam $\epsilon_2$. The same two lenses 28 and 30 image loop beam $\epsilon_2$ into the optical gain medium, preferably an Nd:glass or Nd:YAG slab amplifier 43 for 1 Mm wavelength. Slab amplifiers are well known in the art and are described in J. M. Eggleston, et al., "Slab-Geometry Nd:glass Laser Performance Studies", *Optics Letters*, vol. 7, no. 9, May 1982, pages 405–407 and in M. E. Brodov, et al., "Eight-Pass Neodymium Glass Slab Amplifier with a Waveguide and with Phase Conjugation", *Soviet Journal of Quantum Electronics*, vol. 17, no. 10, October 1987, pages 1265–1266. Other optical gain media such as rod amplifiers could also be used.

Optical wedges 44 and 46 on opposite sides of lens 30 are used to deflect signal beam $\epsilon_1$ enough to prevent loop beam $\epsilon_2$ from following a path exactly opposite to signal beam $\epsilon_1$ and going to the same place as the signal beam $\epsilon_1$ at the entrance plane 32. The magnification of the lens pair 28 and 30 is selected so that the area encompassed by loop beam $\epsilon_2$ is increased to fill approximately one-half of the slab amplifier 43 aperture. Following one pass through the slab amplifier 43, loop beam $\epsilon_2$ is folded around and imaged into the other half of the slab amplifier 43, by lens 48 and mirror 50 for a second amplification pass. After the second amplification pass, loop beam $\epsilon_2$ is designated loop beam $\epsilon'_2$.

Optical wedges 52 and 54 between lens 30 and slab amplifier 43 (with preferable deflection angles of 0.5° and 0.3°, respectively) impose an angular deflection on loop beam $\epsilon'_2$ in order to further separate it's propagation path from that of loop beam $\epsilon_2$. After passing through wedges 52 and 54, loop beam $\epsilon'_2$ is imaged and directed to an optical diode 56 by lenses 28 and 30.

Figure 4:
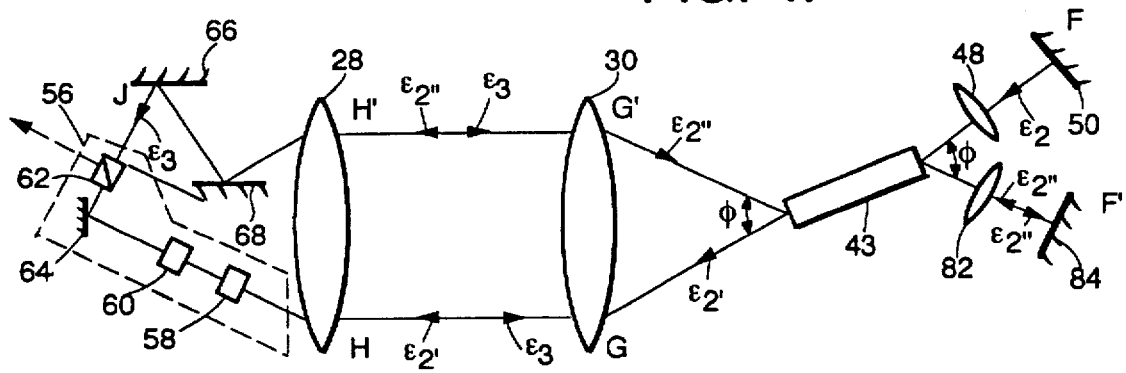
FIG. 4 is a schematic diagram of the embodiment of FIG. 3, taken along a plane that is perpendicular to the plane illustrated in FIG. 3, also showing an embodiment of an optical diode for use with linearly polarized signal beams.
Figure 5:
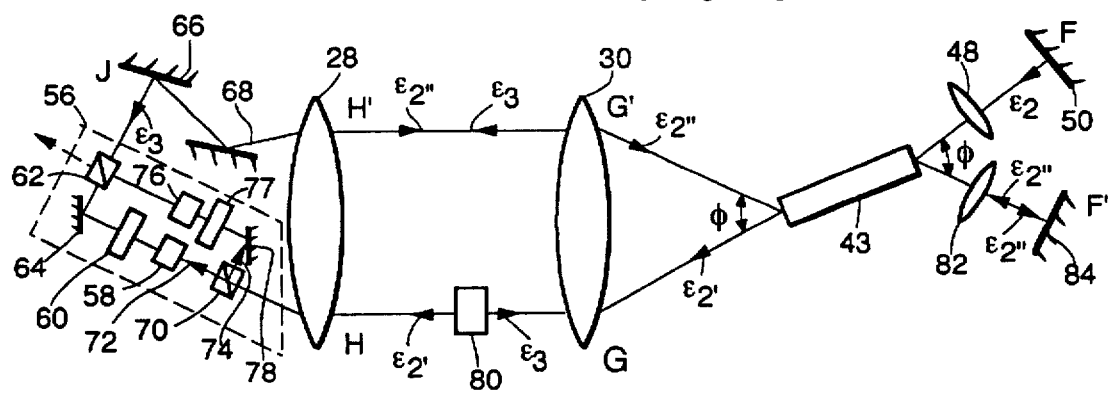
FIG. 5 is a schematic diagram of the embodiment of FIG. 3, taken along the same plane as FIG. 4, and showing a second embodiment of an optical diode for use with de-polarized signal beams.

The path of loop beam $\epsilon'_2$ through optical diode 56 is illustrated in FIGS. 4 and 5, which are both schematic views taken along a plane perpendicular to the plane illustrated in FIG. 3, and which show beam path F-G-H-J-H'-G'-F'.

FIG. 4 illustrates a preferred embodiment of the optical diode 56 for use with signal beams $\epsilon_1$ that are linearly polarized. In this configuration, the optical diode comprises a Faraday rotator 58, a half-wave plate 60, a polarization separator 62 and mirrors 64, 66, and 68. The Faraday rotator 58 is a non-reciprocal optical element that rotates the polarization of an optical beam that passes through it by approximately 45 degrees, regardless of which direction the beam is propagating. In contrast, the half-wave plate 60 is a reciprocal optical element. The direction of polarization rotation for a beam that passes through the half-wave plate is dependent on the beam's propagation direction. The half-wave plate is set so that the electric field of a linearly polarized beam is rotated close to the rotation imparted by the Faraday rotator. The polarization separator 62 is preferably a polarizing beamsplitter that transmits one linear polarization component and reflects an orthogonal component. The combination of a Faraday rotator 58, half-wave plate 60 and polarization separator 62 is a common and well known way of implementing an optical isolator.

The Faraday rotator 58, half-wave plate 60 and polarization separator 62 are adjusted so that a majority of loop beam $\epsilon'_2$ is reflected out of the optical loop by polarizing beamsplitter 62, and so that beams travelling in a direction counter to loop beam $\epsilon'_2$ are transmitted by polarizing beamsplitter 62 with little or no reflection.

As an illustration of how the optical diode 56 operates, it is assumed that loop beam $\epsilon'_2$ is vertically polarized with respect to the plane of FIG. 4. When loop beam $\epsilon'_2$ enters Faraday rotator 58 its polarization is rotated by +45 degrees. The beam then enters half-wave plate 60, which rotates its polarization by another +45 degrees, so that its polarization is now close to horizontal. Mirror 64 then directs the beam to the polarizing beamsplitter 62, the optical axes of which are oriented so that it totally reflects the horizontal polarization and transmits the rest. Mirrors 66 and 68 direct the transmitted portion of the beam to lens 28 at an angle which causes lens 28 to forward the beam on to lens 30.

For a beam $\epsilon_3$ travelling in a direction counter to loop beam $\epsilon'_2$ and with the same vertical polarization as loop beam $\epsilon'_2$ (before it entered the optical diode 56), the majority of beam $\epsilon_3$ passes through beamsplitter 62 (which is oriented to reflect horizontal polarization and transmit only vertical polarization). When the beam $\epsilon_3$ passes through half-wave plate 60 its polarization is rotated by –45 degrees because the half-wave plate 60 is a reciprocal polarization rotator, and beam $\epsilon_3$ is travelling in a direction counter to loop beam $\epsilon'_2$. However, the Faraday rotator 58 rotates the polarization of beam $\epsilon_3$ by +45 degrees because it is a non-reciprocal polarization rotator (insensitive to propagation direction). This rotates the polarization of beam $\epsilon_3$ back to its original vertical polarization.

The present invention may also accommodate de-polarized signal beams $\epsilon_1$ by utilizing the optical diode 56 illustrated in FIG. 5, which is modified to accommodate de-polarized beams. The operation of this optical diode embodiment is similar to that described above, except that a second polarizing beamsplitter 70 is used to separate the de-polarized loop beam $\epsilon'_2$ into two linear orthogonal polarization components. Each polarization component 72 and 74 passes through a respective Faraday rotator 58, 76 and respective half-wave plate 60, 77, with polarization component 74 being directed to its respective Faraday rotator 76 and half-wave plate 77 by mirror 78. The polarization components 72, 74 are then directed to polarizing beamsplitter 62. In this embodiment, a polarization mixer (preferably implemented with a half-wave plate 80) is preferably positioned in the path of loop beam $\epsilon'_2$. The half-wave plate 80 transfers the energy between the horizontal and vertical polarization components of the de-polarized beams passing through it. The purpose of this polarization mixing will be discussed below. The polarization mixer 80 can be placed in many other places within the loop.

After passing through the optical diode 56, the loop beam is designated loop beam $\epsilon''_2$ and is once again imaged into the slab amplifier 43 with lenses 28 and 30. As with the first and second amplifier passes, the magnification of the lens pair 28 and 30 is such that the size of loop beam $\epsilon''_2$ fills approximately one-half of the slab amplifier 43 aperture. The angular separation $\phi$ between beams $\epsilon'_2$ and $\epsilon''_2$ is selected by tilting mirrors 66 and 68 so that they propagate along different zig-zag paths in the slab amplifier 43.

Following a third pass through the slab amplifier 43, loop beam $\epsilon''_2$ is folded around and imaged into the other half of the slab amplifier 43, for a fourth amplification pass, by lens 82 and mirror 84. After the fourth amplification pass, loop beam $\epsilon''_2$ is designated loop beam $\epsilon'''_2$ and its path is continued in FIG. 6, which is a schematic view taken along a second plane perpendicular to the plane illustrated in FIG. 3, and which shows beam paths C-D-E-F and F'-E'-D'-C.

Beam $\epsilon'''_2$ makes another pass through lens pair 28 and 30 and is re-imaged onto the nonlinear cell 12, at which point one trip around the optical loop has been completed. Beam $\epsilon'''_2$ optically interferes with signal beam $\epsilon_1$ in the nonlinear medium 38 and forms a refractive index grating (not shown). If the signal beam is de-polarized, then two separate refractive index gratings are written for each of the two orthogonal polarization components of the de-polarized signal beam $\epsilon_1$ and resulting loop beam $\epsilon'''_2$. An appropriate beam block or wedge should be positioned in the path of beam $\epsilon'''_2$ after it reflects from the nonlinear cell 12, to prevent $\epsilon'''_2$ from being reimaged into the amplifier again.

As explained above, in the embodiment for de-polarized signal beams a polarization mixer (element 80 in FIG. 5) is used to mix the two orthogonal polarization components of the loop beams. The de-polarized signal beam $\epsilon_1$ is made up of an S-polarization component ($I_{in,s}$) and a P-polarization component ($I_{in,p}$). At the polarization mixer 80, the energy from these two components are exchanged/mixed. Thus the S-polarization component of loop beam $\epsilon'''_2$ at the nonlinear cell 12 contains information from both S and P polarization components of signal beam $\epsilon_1$ ($I_{in,s}$ and $I_{in,p}$). Similarly, the P-polarization component of loop beam $\epsilon'''_2$ contains information from $I_{in,s}$ and $I_{in,p}$ as well. As a result, the gratings that are written in the nonlinear medium 38 when signal beam $\epsilon_1$ and loop beam $\epsilon'''_2$ optically interfere will couple both polarizations.

The intensity of the S and P polarization components of loop beam $\epsilon'''_2$ at the nonlinear cell 12 are designated $I_{2,s}$ and $I_{2,p}$, respectively. For proper phase conjugation of the polarization of a de-polarized signal beam $\epsilon_1$ the ratio $I_{2,p}/I_{2,s}$ must be adjusted properly. This may be done experimentally by rotating the half-wave plate 80 until the proper ratio is achieved.

Referring back to FIGS. 4–6, a laser oscillation beam $\epsilon_3$ builds up from optical noise in the resonator/loop and oscillates in a direction counter to the propagation direction of loop beam $\epsilon'_2$, due to the non-reciprocal loss introduced by optical diode 56 which produces very little loss for $\epsilon_3$ but a large loss for $\epsilon'_2$. Referring to FIG. 3, a portion of beam $\epsilon_3$ is diffracted by the refractive index grating (or gratings for a depolarized signal beam) and remains in the loop, while another portion is transmitted through the grating, reflects off the reflective back surface 39 of window 36 and exits the cell 12 as phase conjugate output beam $\epsilon_4$.

As an illustrative example, design parameters will be given for a compact loop four-wave mixing phase conjugator designed for an input signal beam $\epsilon_1$ having a beam divergence-aperture product of 120 mm-mrad (approximately 100 times diffraction limited), and that originates from a rectangular aperture having dimensions of 6 mm×14 mm. For this type of signal beam, the lenses 28 and 30 preferably have focal lengths of 25 cm and 35 cm, respectively, and a diameter of 65 mm. These focal lengths produce a magnification ($f_2/f_1$) of 1.4, which produces a spot size of approximately 4 mm×10 mm in the nonlinear medium 38. The schematic of FIG. 3 lies in a plane that is parallel to the 10 mm dimension, which corresponds to a full-angle beam divergence of approximately 12 mrad going into the nonlinear cell 12. The angular separation $\theta$ between signal beam $\epsilon_1$ and loop beam $\epsilon_2$ is adjusted to exceed this beam divergence by orienting the nonlinear cell 12 appropriately. For example, an angular separation $\theta$ of approximately 50 mrad will exceed the 12 mrad beam divergence by a factor of approximately 4.

Figure 6:
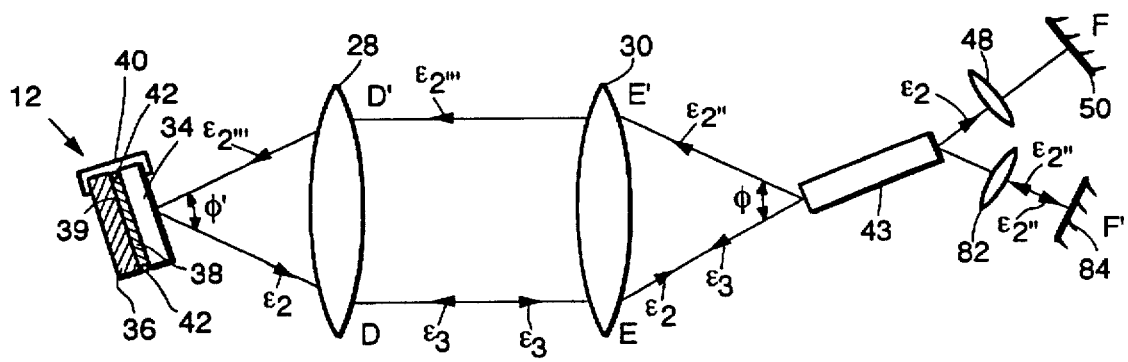
FIG. 6 is a schematic diagram of the embodiment of FIG. 3, taken along a second plane that is perpendicular to the plane illustrated in FIG. 3.

In the planes of FIGS. 4, 5 and 6 (parallel to the 4 mm dimension of signal beam $\epsilon_1$), the beam divergence is 30 mrad. The other relevant angle in the architecture is $\phi$. This angle is determined by the geometry of the slab amplifier 43, which is preferably a Nd:YAG slab amplifier with a width of 6 mm, a height of 28 mm, and a small signal gain intensity of approximately 3.9 per pass. Specifically $\phi$ is set to a value that will allow loop beams $\epsilon'_2$ and $\epsilon''_2$ to propagate along different paths through the slab amplifier 43 (the beams make different integral numbers of zig-zag bounces through the slab amplifier). Using such angular separation to obtain two discrete passes through the amplifier 53 is typically called "angular multiplexing". For the present illustrative example, $\phi$ is preferably approximately 4 degrees, which results in an angle $\phi'$ of 5.6 degrees between $\epsilon_2$ and $\epsilon'''_2$ at the nonlinear cell 12. These angles are set by adjusting mirrors 66 and 68 in FIGS. 4 and 5. For the present illustrative example, the optical transmission of the optical diode 56 is preferably approximately 5–10% for beam $\epsilon'_2$ and approximately 90–100% for beams that propagate in a direction counter to beam $\epsilon'_2$ (such as beam $\epsilon_3$ that builds up from optical noise).

Figure 7:
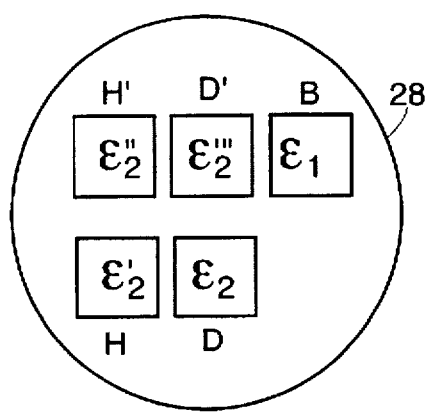
FIG. 7 is an elevation view along the view line 7—7 of FIG. 3.

FIG. 7 is an elevation view of lens 28 taken along the view line 7—7 of FIG. 3, illustrating how the loop beams are spaced as they pass through lens 28. The approximate beam sizes shown relative to lens 28 include beam spreading effects due to the respective beam divergence values for the two orthogonal dimensions.

Numerous variations and alternate embodiments will occur to those skilled in the art without departing from the spirit and scope of the invention. Such variations and alternate embodiments are contemplated, and can be made without departing from the spirit and scope of the appended claims.

We claim:

1. A compact loop phase conjugator, comprising:

a nonlinear cell with an optically transmissive front surface, an optically reflective back surface, and an optically nonlinear medium between said front and back surfaces, a signal beam $\epsilon_1$ directed to the front surface of said nonlinear cell propagating through said cell, reflecting off said reflective back surface, propagating back through said cell and emerging from said cell as a loop beam $\epsilon_2$, relay optics that direct loop beam $\epsilon_2$ back to said nonlinear cell so that it intersects and optically interferes with said signal beam $\epsilon_1$ at said cell to form a refractive index grating in said cell, said relay optics and refractive index grating forming an optical loop, an optical diode positioned in said optical loop, said optical diode producing a non-reciprocal optical loss in said optical loop that is greater for optical beams propagating along the propagation direction of loop beam $\epsilon_2$ than for optical beams propagating in the opposite direction, and an optical gain medium positioned in said optical loop, said gain medium and optical loop forming a ring laser resonator, said optical diode and gain medium positioned in said optical loop so that an oscillation beam $\epsilon_3$ builds up from optical noise in said resonator and oscillates in a direction counter to the propagation direction of loop beam $\epsilon_2$, with a portion of oscillation beam $\epsilon_3$ being transmitted by said refractive index grating, reflecting off the reflective back surface of said nonlinear cell, and exiting said cell as an output beam $\epsilon_4$.

2. The phase conjugator of claim 1, wherein said nonlinear cell comprises:

front and back windows, each window having respective inside and outside surfaces, a nonlinear medium sandwiched between the inside surfaces of said front and back windows, and a reflective coating on the inside surface of said back window.

3. The phase conjugator of claim 2, wherein said nonlinear medium comprises an absorptive liquid.

4. The phase conjugator of claim 3, wherein said absorptive liquid comprises copper nitrate in an acetone base.

5. The phase conjugator of claim 1, wherein said gain medium comprises an Nd:glass or Nd:YAG slab amplifier.

6. A compact, loop phase conjugator, comprising:

a nonlinear cell with an optically transmissive front surface, an optically reflective back surface, and an optically nonlinear medium between said front and back surfaces, an imager that directs a signal beam $\epsilon_1$ to the front surface of said nonlinear cell so that said signal beam propagates through said cell, reflects off said reflective back surface, propagates back through said cell and emerges from said cell as a loop beam $\epsilon_2$, said imager spaced from said nonlinear cell so that said signal beam is imaged onto the reflective back surface of said cell, an amplifier positioned on a side of said imager opposite said nonlinear cell, so that loop beam $\epsilon_2$ makes a first pass through said imager, is re-imaged onto a front surface of said amplifier, performs a first pass through said amplifier, and exits from a back surface of said amplifier, a first beam director positioned to re-direct loop beam $\epsilon_2$ to the back surface of said amplifier so that said loop beam performs a second pass through said amplifier along a different path than said first amplifier pass, exits from the front surface of said amplifier, and makes a second pass through said imager, an optical diode positioned in the path of loop beam $\epsilon_2$ on the same side of said imager as said nonlinear cell, said optical diode producing a non-reciprocal optical loss that is greater for optical beams propagating along the propagation direction of loop beam $\epsilon_2$ than for optical beams propagating in the opposite direction, a second beam director positioned to direct a portion of said loop beam $\epsilon_2$ that is transmitted by said optical diode back to said imager for a third pass, and to the front surface of said amplifier so that said loop beam $\epsilon_2$ makes a third pass through said amplifier and exits through the back surface of said amplifier, and a third beam director positioned to re-direct loop beam $\epsilon_2$ to the back surface of said amplifier so that said loop beam performs a fourth pass through said amplifier along a different path from said third amplifier pass, exits from the front surface of said amplifier, makes a fourth pass through said imager, enters said nonlinear cell, and optically interferes with said signal beam $\epsilon_1$ at said cell to form a refractive index grating in said cell, said refractive index grating, imager, beam directors, amplifier and optical diode forming a unidirectional laser resonator in which an oscillation beam $\epsilon_3$ builds up from optical noise and oscillates in a direction counter to the propagation direction of loop beam $\epsilon_2$, with a portion of oscillation beam $\epsilon_3$ being transmitted by said refractive index grating, reflecting off the reflective back surface of said nonlinear cell, and exiting said cell as an output beam $\epsilon_4$.

7. The phase conjugator of claim 6, for a signal beam that is linearly polarized, wherein said optical diode comprises:

a Faraday rotator positioned in the path of loop beam $\epsilon_2$, said rotator imparting a non-reciprocal phase shift to said loop beam $\epsilon_2$, a reciprocal polarization rotator positioned in the path of loop beam $\epsilon_2$, said polarization rotator imparting a reciprocal phase shift to said loop beam $\epsilon_2$, and a polarization separator positioned in the path of said loop beam $\epsilon_2$ after said Faraday rotator and reciprocal polarization rotator, said separator separating loop beam $\epsilon_2$ into a first polarization component and a second orthogonal polarization component that propagate along different paths, said Faraday rotator, reciprocal polarization rotator and polarization separator oriented so that a majority of loop beam $\epsilon_2$ is diverted out of said resonator by said polarization separator, and so that optical beams propagating in a direction counter to loop beam $\epsilon_2$ are not diverted out of said resonator.

8. The phase conjugator of claim 7, wherein said Faraday rotator, reciprocal polarization rotator and polarization separator are oriented so that approximately 90% of loop beam $\epsilon_2$ is diverted out of said resonator by said polarizing beamsplitter.

9. The phase conjugator of claim 6, for a signal beam that is de-polarized, wherein said optical diode comprises:

- a first polarization separator positioned in the path of loop beam $\epsilon'_2$, said separator separating loop beam $\epsilon'_2$ into a first polarization component and a second orthogonal polarization component that propagate along first and second paths, respectively,
- a first Faraday rotator positioned along said first path that imparts a non-reciprocal phase shift to said first polarization component,
- a first reciprocal polarization rotator positioned along said first path that imparts a reciprocal phase shift to said first polarization component,
- a second Faraday rotator positioned along said second path that imparts a non-reciprocal phase shift to said second polarization component,
- a second reciprocal polarization rotator positioned along said second path that imparts a reciprocal phase shift to said second polarization component, and
- a second polarization separator positioned to receive said first and second polarization components after they have passed through their respective Faraday rotators and reciprocal polarization rotators,
- said polarization separators, Faraday rotators and reciprocal polarization rotators oriented so that a majority of loop beam $\epsilon'_2$ is diverted out of said resonator, and so that optical beams propagating in a direction counter to loop beam $\epsilon'_2$ are not diverted out of said resonator.

10. The phase conjugator of claim 9, wherein said polarization separators, Faraday rotators and reciprocal polarization rotators are oriented so that approximately 90% of loop beam $\epsilon'_2$ is diverted out of said resonator.

11. The phase conjugator of claim 9, further comprising a polarization mixer in said resonator that mixes the polarization components of optical beams propagating in said resonator.

12. The phase conjugator of claim 6, wherein said nonlinear cell comprises:

- front and back windows, each window having respective inside and outside surfaces,
- a nonlinear medium sandwiched between the inside surfaces of said front and back windows, and
- a reflective coating on the inside surface of said back window.

13. The phase conjugator of claim 12, wherein said nonlinear medium comprises an absorptive liquid.

14. The phase conjugator of claim 13, wherein said absorptive liquid comprises copper nitrate in an acetone base.

15. The phase conjugator of claim 6, wherein said amplifier comprises an Nd:glass or Nd:YAG slab or rod amplifier.

16. The phase conjugator of claim 6, wherein said imager comprises two lenses.

* * * * *